Aug. 10, 1965  S. E. NELSEN  3,199,437
INFUSION APPARATUS
Filed Feb. 25, 1963
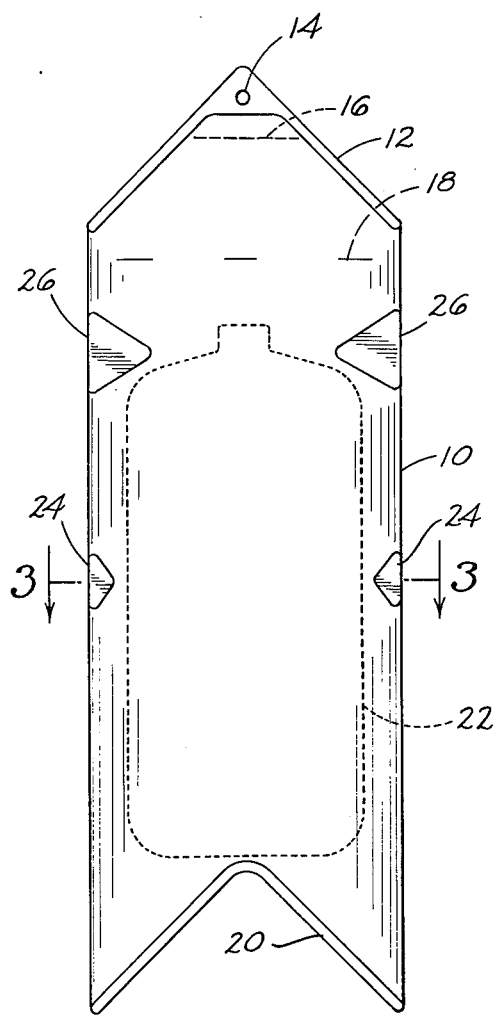
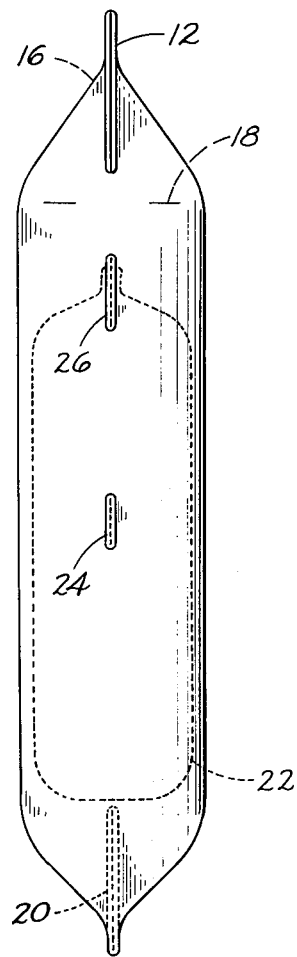
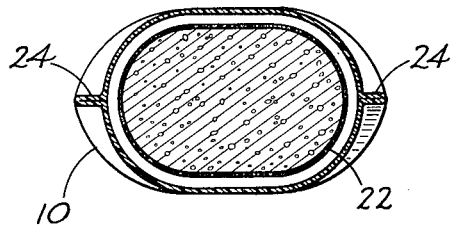
Silas E. Nelsen
INVENTOR.
BY Eugene D. Farley
Atty.

United States Patent Office 3,199,437
Patented Aug. 10, 1965

3,199,437
INFUSION APPARATUS
Silas E. Nelsen, 2715 Center St., Tacoma, Wash.
Filed Feb. 25, 1963, Ser. No. 260,515
1 Claim. (Cl. 99—317)

This invention relates to apparatus for making cold water infusions. It pertains particularly to apparatus for making cold water coffee infusions useful in the preparation of beverage coffee of superior flavor and quality.

It has been discovered that when a measured amount of ground coffee is soaked in a predetermined quantity of cold water, an infusion is formed which may be refrigerated and stored. The infusion then may be used in the preparation of a markedly superior coffee brew, merely by measuring out the desired amount of the infusion and adding it to hot water.

This procedure has several signficant advantages. First, the coffee prepared is of demonstrably better flavor, being free from bitterness, oily principles and rancid tasting components. Second the coffee may be made of any desired strength. Third, the infusion extraction process is carried out easily with a minimum of effort and without the necessity of using elaborate extraction apparatus. Fourth, there is no waste, since only as much of the infusion or extract is employed as is required, the remainder being refrigerated and stored.

It is the principal object of the present invention to provide apparatus for making coffee and other cold water infusions in the manner described above.

It is a particular object of the present invention to provide apparatus for making cold water coffee infusions which apparatus broadly comprises an outer, water-impervious, flexible bag containing a water-pervious inner bag filled with ground coffee or other material to be extracted. The outer bag is provided with spacing means for centering the inner bag.

This assembly may be contained in a package occupying little, if any, more space than does a bag of ground coffee. Hence it may be distributed and marketed in the usual manner.

When the user wishes to make the coffee infusion, he upwraps the package, opens the top of the outer container and fills it with cold water. The coffee is allowed to steep for the predetermined period of time, after which the resulting infusion or cold water extract is poured out through the same opening as was used to fill the container with water. The infusion then may be stored and used in the manner indicated above. The residual assembly, including the two containers and the extracted coffee, may be disposed of with the household refuse.

The manner in which the foregoing objects are obtained will be apparent from the following specification and claim considered together with the drawings, wherein:

FIG. 1 is a view in front elevation of the herein described infusion apparatus;

FIG. 2 is a view in side elevation of the apparatus of FIG. 1; and

FIG. 3 is a transverse, sectional view taken along line 3—3 of FIG. 1.

As is apparent from the drawings, the herein described infusion apparatus includes a water-impervious outer container 10 which is of sufficient size to accommodate any conveniently handled amount of water, for example, from 2–4 quarts. It may be made of any suitable flexible structural material. Preferably it is made of a heat-fusible plastic of sufficient thickness and strength to accommodate the desired contents.

The outer container may be fabricated to advantage from a plastic tube cut in lengths, each length having its top and bottom sealed to form a closed container. During the fabricating operation, the top 12 may be peaked, as shown in FIG. 1, and provided with a reinforced opening 14 by means of which the assembly may be suspended from a hook or other support.

Near the apex of the peaked top of the outer container there may be located an area adaptable for cutting along a guide line 16. In this manner there is provided an opening for use first in filling the container with cold water, and then for discharging the infusion resulting from the extraction.

Also, there may be provided on the outer side wall of the container a line 18 which marks the height to which the container should be filled with cold water during its use.

The sealed bottom 20 of the outer container preferably is formed in a sharply concave configuration. This provides an inwardly extending projection.

The outer container is dimensioned to receive an inner container 22 which holds the coffee or other material from which the infusion is to be prepared. The inner container may be made from such materials as cloth, porous paper, plastic mesh, etc. It preferably is made of felted cotton.

The inner container contains a measured amount of ground coffee, roots, bark, leaves, seeds, beans, or other material to be extracted. It is contemplated that it will contain, for example, one pound of ground coffee.

Means are provided for maintaining the inner container spaced apart from the bottom and side walls of outer container 10, and also to keep the inner container submerged below the level of line 18 when the outer container is filled with water. This insures that there will be free circulation of the extracting liquid through and around the inner container. It also insures that all of the contents of the inner container will be exposed to the action of the extracting liquid.

It will be apparent that the inwardly extending projection provided by the concaved configuration of the bottom 20 of the outer container will space the inner container upwardly to the desired extent. There also are provided, however, a plurality of projections 24 extending inwardly from the side walls of the outer container. These preferably are formed by fusing the side walls together at spaced intervals. They serve the function of centering the inner container.

There further are provided a plurality of inwardly extending projections 26. These extend inwardly beyond the plane of the side walls of the inner container 22 and serve as abutments to prevent the inner container and its buoyant contents from floating upwardly to the surface of the water.

In practice, the outer container 10 is fabricated in the manner described above, but with the top sealed and the bottom left open. The coffee manufacturer or distributor then will fill porous inner container 22 with his particular brand of coffee and insert it into the open bottom 20 of the outed container. The latter then is sealed by fusing its edges, or otherwise.

The outer container is wrapped in a wrapper and the assembly tied or packaged. It then may be distributed and sold through the usual channels.

When the purchaser wishes to use the package, he unwraps it and cuts an opening along line 16. He then fills it with water or other infusion liquid until the level of the liquid reaches line 18. When preparing a coffee infusion, he may fill it with water at a temperature of from 32–110° F.

The filled assembly is hung on a hook using opening 14, or merely placed upright in a convenient corner, for a time predetermined to prepare an infusion of the desired strength. In the case of coffee, this is for a period sufficient to extract the desirable principles of the coffee substantially completely, which may require from 12–36 hours.

After the steeping has been completed, the infusion is poured out from slit opening 16 into a suitable container. The used infusion apparatus is burned or discarded. The infusion product may be stored in a refrigerator and used over a period of time in the preparation of a superior coffee brew. The resulting beverage will be found to be a clear, dark-colored liquid which is completely free of bitter, ill-tasting or ill-smelling components.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

Infusion apparatus comprising:
(a) a water-impervious, flexible, plastic tube sealed at its top and bottom and adapted to be filled with water to a predetermined level, and
(d) a water-pervious mesh fabric bag filled with the material to be infused and contained within the plastic tube,
(c) the sealed bottom of the tube being concave with the bottom of the fabric bag supported freely upon the apex of said concave bottom and the side walls of the tube being fused together at spaced intervals below the top thereof to provide inwardly extending projections freely engaging the side walls and top of the fabric bag for maintaining the mesh fabric bag submerged and spaced from the walls of the plastic tube,
(d) the plastic tube being adapted to be slit in its upper portion above the predetermined level of the water, thereby providing a filling opening for filling the bag with water and a discharging opening for discharging the infusion product of the apparatus.

References Cited by the Examiner
UNITED STATES PATENTS

| | | | |
|---|---|---|---|
| 397,257 | 2/89 | Tarring | 99—319 |
| 528,594 | 11/94 | During | 99—319 |
| 2,087,236 | 7/37 | Anders | 99—77.1 |
| 2,664,358 | 12/53 | Eichler | 99—187 |
| 2,918,379 | 12/59 | Lurie. | |

ROBERT E. PULFREY, *Primary Examiner.*

JEROME SCHNALL, WILLIAM B. PENN, *Examiners.*